United States Patent
Nishioka et al.

(10) Patent No.: US 7,623,323 B2
(45) Date of Patent: Nov. 24, 2009

(54) MAGNETORESISTIVE HEAD AND READ/WRITE SEPARATION-TYPE MAGNETIC HEAD

(75) Inventors: Koichi Nishioka, Kanagawa (JP); Shuichi Kojima, Kanagawa (JP); Koji Kataoka, Kanagawa (JP); Takayoshi Ohtsu, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 458 days.

(21) Appl. No.: 11/227,677

(22) Filed: Sep. 14, 2005

(65) Prior Publication Data

US 2006/0067013 A1    Mar. 30, 2006

(30) Foreign Application Priority Data

Sep. 24, 2004   (JP) ............... 2004-276757

(51) Int. Cl.
*G11B 5/33* (2006.01)
*G11B 5/127* (2006.01)

(52) U.S. Cl. ............... 360/324.11; 360/324.1
(58) Field of Classification Search ............ 360/324.11, 360/324.1
See application file for complete search history.

(56) References Cited

U.S. PATENT DOCUMENTS

| | | | | |
|---|---|---|---|---|
| 5,583,725 A * | 12/1996 | Coffey et al. | ........... | 360/324.11 |
| 5,583,752 A | 12/1996 | Sugimoto et al. | | |
| 6,038,107 A | 3/2000 | Pinarbasi | | |
| 2001/0028537 A1 * | 10/2001 | Gill | ........... | 360/314 |
| 2001/0040780 A1 * | 11/2001 | Pinarbasi | ........... | 360/324.11 |
| 2002/0135952 A1 * | 9/2002 | Gill | ........... | 360/324.11 |
| 2002/0159199 A1 * | 10/2002 | Gill | ........... | 360/314 |
| 2003/0062981 A1 | 4/2003 | Hosomi et al. | | |
| 2004/0008450 A1 * | 1/2004 | Gill | ........... | 360/314 |
| 2005/0068683 A1 * | 3/2005 | Gill | ........... | 360/314 |
| 2005/0201022 A1 * | 9/2005 | Horng et al. | ........... | 360/324.11 |
| 2006/0002038 A1 * | 1/2006 | Gill | ........... | 360/324.11 |
| 2006/0098352 A1 * | 5/2006 | Gill | ........... | 360/324.1 |

FOREIGN PATENT DOCUMENTS

| | | |
|---|---|---|
| JP | 11-191207 | 7/1999 |
| JP | 2000-113418 A | 4/2000 |
| JP | 2002-150512 | 5/2002 |

* cited by examiner

*Primary Examiner*—Andrea L Wellington
*Assistant Examiner*—Adam B Dravininkas
(74) *Attorney, Agent, or Firm*—Townsend and Townsend and Crew LLP; Rambod Nader

(57) ABSTRACT

Embodiments of the invention provide a reading head structure that ensures a stable magnetic moment of a pinned layer against a great external magnetic field, and minimizes the pinned-layer damage occurring during air-bearing surface machining. In one embodiment, a magnetoresistive head is based on a spin-valve effect and has free layers, a stacked-type pinned layer, and an electroconductive nonmagnetic spacer layer positioned between the free layers and the stacked-type pinned layer. The stacked-type pinned layer includes three ferromagnetic films, and antiferromagnetic coupling films interposed between the ferromagnetic films. Of these ferromagnetic films, the first two films have a high coercivity and a high resistivity. The third ferromagnetic film is made of a material that gives a great magnetoresistive effect. The sum of the magnetic moments generated from the stacked-type pinned layer is substantially zero.

14 Claims, 10 Drawing Sheets

(a)

(b)

MAGNETORESISTIVE HEAD AND READ/WRITE SEPARATION-TYPE MAGNETIC HEAD

CROSS-REFERENCES TO RELATED APPLICATIONS

This application claims priority from Japanese Patent Application No. JP2004-276757, filed Sep. 24, 2004, the entire disclosure of which is incorporated herein by reference.

BACKGROUND OF THE INVENTION

The present invention relates to a magnetoresistive head and a read/write separation-type magnetic head, and more particularly, to a magnetoresistive head with a stacked-type pinned layer.

The use of spin-valve magnetoresistive sensors in read-only magnetic heads is increasing the tendency towards further improvement of magnetic recording devices in recording density in recent years. Spin-valve magnetoresistive sensors are basically constructed of a ferromagnetic layer called the pinned layer, a ferromagnetic soft layer called the free layer, an electroconductive layer directly adjacent to and interposed between the above two layers, and an exchange-coupled layer coming into direct contact with the pinned layer. An antiferromagnetic material is usually used for the exchange-coupled layer. Each such sensor also has electrode members that pass an electric current through the above layers, and a vertical-bias layer that applies a vertical-bias magnetic field for suppressing noise (called the Barkhausen noise) due to the nonuniformity of free-layer magnetization. The vertical-bias layer usually uses a Co-based permanent magnet film. The sensor is provided in a very small space (called the reading gap) interposed between two ferromagnetic materials called the magnetic shields. Thus, a magnetoresistive head is constructed and the magnetizing signal of a recording medium is reproduced with high resolution.

The pinned layer has its magnetization fixed in a direction perpendicular to the side facing the recording medium (i.e., the air bearing surface of the magnetic head), and does not change its magnetization direction with respect to the magnetic field of the medium or the magnetic field applied to the sensor film during recording. Free-layer magnetization changes in direction according to the magnetic field applied from the recording medium, consequently causing a magnetoresistive change by changing the angle formed by the pinned-layer magnetization and the free-layer magnetization. The section reproducing this magnetoresistive change as a signal is the spin-valve-type head (magnetoresistive head).

The exchange-coupled layer is adjacent to the pinned layer and applies a strong bias field thereto. This bias field fixes the magnetization of the pinned layer, thus preventing its magnetization direction from suffering changes due to the magnetic field applied from the recording medium or the magnetic field applied from a recording head. The exchange-coupled layer is usually formed using an antiferromagnetic material, and the exchange-coupling magnetic field applied to the pinned layer in the operating temperature range of the sensor needs to be strong enough. A binary alloy with a 1:1 composition of platinum (Pt) and manganese (Mn) is primarily put into practical use to satisfy the need.

The foregoing exchange-coupled layer needs to have a film thickness of about 60 nm to augment the exchange-coupling magnetic field, and that is one of the reasons why the length of the reading gap cannot be reduced since high-density read/write operation must be ensured. Magnetoresistive heads having a structure not including an exchange-coupled layer adjacent to a pinned layer are disclosed in Patent Document 1 (U.S. Pat. No. 5,583,752) and Patent Document 2 (Japanese Patent Laid-open No. 2000-113418).

BRIEF SUMMARY OF THE INVENTION

In order to effectively sense the magnetic field applied from the magnetic bits recorded on the medium, the magnetoresistive sensor film is exposed on the side of the magnetic head that faces the medium, and an ABS protective film is formed on the sensor film. A magnetic head with this form of construction is generated using two processes. One process is to form head elements on a substrate, and the other process is slider machining in which each head element is sliced out from the substrate having the multiple head elements formed thereon and then the substrate is machined to a shape suitable for pneumatically lifting a lower front portion, called the slider, of the head from the surface of the recording medium. During the slider-machining process, the substrate is machined into smaller units of blocks called the bars each having multiple head elements. The bars are polished in a process called "computer lapping", and the magnetoresistive sensor film is exposed on the side opposite to the medium. This process is referred to as the air-bearing surface machining process.

To implement high-density recording of a 100-Gbits/in$^2$ class, the microstructuring of the magnetoresistive sensor film is required, and microstructuring for a track width of 0.1 micron or less and a sensor height of 0.1 µm or less is already attempted. The sensor height here refers to the vertical dimension of the sensor film with respect to the opposite side of the medium. Among the big bottlenecks in such a microstructuring process is that the exchange-coupled layer and pinned layer of the sensor film are damaged when the air-bearing surface is machined for a sensor height of 0.1 micron or less. Damage to the pinned layer makes the direction of the bias field applied from the exchange-coupled layer thereto deviate from the desired direction, resulting in the magnetization direction of the pinned layer also deviating from its desired direction. Such deviation, in turn, reduces the strength of the signal reproduced, and increases the nonuniformity of the signal strength between read elements and the nonuniformity of the signal in terms of symmetry. Since damage to the pinned layer becomes more significant with finer microstructuring of the sensor film, the damage makes the microstructuring itself difficult and becomes a big obstruction to higher-density recording.

It has come to be seen that the damage to the pinned layer during air-bearing surface machining is caused by the fact that the significant strain applied when the ceramic material forming the slider is polished in the air-bearing surface machining process changes the magnetization direction of the pinned layer because of a magnetoelastic effect.

For a head having the spin-valve sensor film that uses a Pt—Mn alloy in its exchange-coupled layer, it is known that the damage to the pinned layer can be improved to a certain degree by applying heat at a temperature of 200° C. or more in a strong magnetic field. Excessive heating, however, causes the other side effect that the pole of the write head suddenly moves out to the air-bearing surface.

In those spin-valve heads of a type not having an exchange-coupled layer that are described in Patent Documents 1 and 2 above, the pinned layer, instead of having an exchange-coupled layer formed of an antiferromagnetic material, has two ferromagnetic layers coupled in antiparallel states to each other. Because of their antiparallelism, the two ferromagnetic layers are in apparent magnetic moment and thus increase in the strength of an apparent magnetic anisotropy field, the pinned layer is of the structure where it does not easily change against external magnetic fields. In this structure, the pinned layer may be magnetically damaged during air-bearing surface machining and the magnetization direction of the pinned layer thus changes to a direction different from a desirable one. In this case, since the spin-valve head does not have an exchanged-coupled layer formed of an antiferromagnetic material, it is possible that the desired magnetization state of the pinned layer is likewise recoverable just by applying a magnetic field at room temperature without exposing the pinned layer to a high temperature. It has come to be seen, however, that when this type of head is actually used inside a hard-disk drive, the physical shock applied during emergency unloading of the head when it is retracted from the disk surface as, in a manner of speaking, an emergency escape measure, reverses the magnetization of the pinned layer. The pinned layer in this type of head does not have strong enough a magnetization structure.

A feature of the present invention is to provide a magnetoresistive head capable of minimizing the deterioration of the magnetic structure of a pinned layer.

Another feature of the present invention is to provide a read/write separation-type magnetic head suitable for high-density recording.

In accordance with an aspect of the present invention, a magnetoresistive head includes: a substrate; a lower magnetic shield film and an upper magnetic shield film, both disposed at the top of the substrate; a stacked-type pinned layer and free layers, each disposed between the lower magnetic shield film and the upper magnetic shield film; a nonmagnetic spacer layer disposed between the stacked-type pinned layer and the free layers; magnetic domain control films disposed at both ends of each of the free layers; and electrode films each arranged at the top of each of the magnetic domain control films.

This head is characterized in that: the stacked-type pinned layer has at least three ferromagnetic films, and antiferromagnetic coupling films each disposed between any two of the ferromagnetic films; and of the ferromagnetic films, one ferromagnetic film adjacent to the nonmagnetic spacer layer has highly magnetoresistive characteristics and the other ferromagnetic films have a coercivity and a resistivity superior to those of the highly magnetoresistive ferromagnetic film.

In some embodiments, the magnetization directions of the ferromagnetic films constituting the stacked-type pinned layer are antiparallel to each other. The sum of the magnetic moments of the stacked-type pinned layer is substantially zero. It is desirable that the coercivities of the foregoing ferromagnetic film and of the other ferromagnetic films should be about 16 kA/m or more and that the resistivities of each should be 40 about μΩcm or more. The stacked-type pinned layer is disposed on the substrate side, and the free layers are disposed at positions more distant from the stacked-type pinned layer than a position of the stacked-type pinned layer. The free layers are disposed on the substrate side, and the stacked-type pinned layer is disposed at a position more distant from the substrate than the positions of the free layers.

In accordance with another aspect of the invention, a magnetoresistive head includes: a substrate; a lower magnetic shield film and an upper magnetic shield film, both disposed at the top of the substrate; a stacked-type pinned layer and free layers, all disposed between the lower magnetic shield film and the upper magnetic shield film; a nonmagnetic spacer layer disposed between the stacked-type pinned layer and the free layers; magnetic domain control films disposed at both ends of each of the free layers; and electrode films arranged at the tops of the magnetic domain control films.

This head is characterized in that: the stacked-type pinned layer has at least three ferromagnetic films, and antiferromagnetic coupling films each disposed between any two of the ferromagnetic films; and of the ferromagnetic films, one ferromagnetic film adjacent to the nonmagnetic spacer layer has a composition rate satisfying $Co_{100-Z}Fe_z, 20 \geq Z(at\%) \geq 0$, and the other ferromagnetic films, except the ferromagnetic film adjacent to the nonmagnetic spacer layer, each have a composition rate satisfying $(Co_{1-Y}Fe_Y)_{100-X}M_X, 0.8 \geq Y(at\%) \geq 0.4, 12 \geq X(at\%) \geq 2$ where M is an element selected from the group consisting of V, Cr, Ti, Mo, Nb, Zr, and Ta.

It is desirable that all the other ferromagnetic films forming the stacked-type pinned layer, except the ferromagnetic film adjacent to the nonmagnetic spacer layer, should have a film thickness of about 1.2 nm or more. It is also desirable that the above ferromagnetic films should be Ru films and that the film thickness of each should range from about 0.3 to 0.4 nm. The stacked-type pinned layer is disposed on an underlayer, and the underlayer is a stacked layer formed up of an NiFeCr film and an NiFe film.

In accordance with another aspect of the present invention, a read/write separation-type magnetic head includes: a magnetoresistive head having a substrate, a lower magnetic shield film and an upper magnetic shield film, both of the films being disposed at the top of the substrate, a stacked-type pinned layer and free layers, all of the layers being disposed between the lower magnetic shield film and the upper magnetic shield film, a nonmagnetic spacer layer disposed between the stacked-type pinned layer and the free layers, magnetic domain control films disposed at both ends of each of the free layers, and electrode films arranged at the tops of the magnetic domain control films, and the magnetoresistive head being characterized in that the stacked-type pinned layer has at least three ferromagnetic films, and antiferromagnetic coupling films each disposed between any two of the ferromagnetic films, in that one of at least the three ferromagnetic films that is adjacent to the nonmagnetic spacer layer has highly magnetoresistive characteristics, and in that the other ferromagnetic films are each higher than the highly magnetoresistive ferromagnetic film in terms of coercivity and resistivity; and a magnetic recording head provided adjacently to the magnetoresistive head, the magnetic recording head having a lower magnetic film, a magnetic gap film, an upper magnetic film which is formed with a magnetic pole piece facing the lower magnetic film via the magnetic gap film and is connected to the lower magnetic film at rear, and conductor coils each disposed between the lower magnetic film and the upper magnetic film via an insulator.

According to the present invention, it is possible to provide a magnetoresistive head capable of minimizing the deterioration of the magnetic structure of a pinned layer.

According to the present invention, it is also possible to provide a read/write separation-type magnetic head suitable for high-density recording.

DETAILED DESCRIPTION OF THE INVENTION

Figure 4:
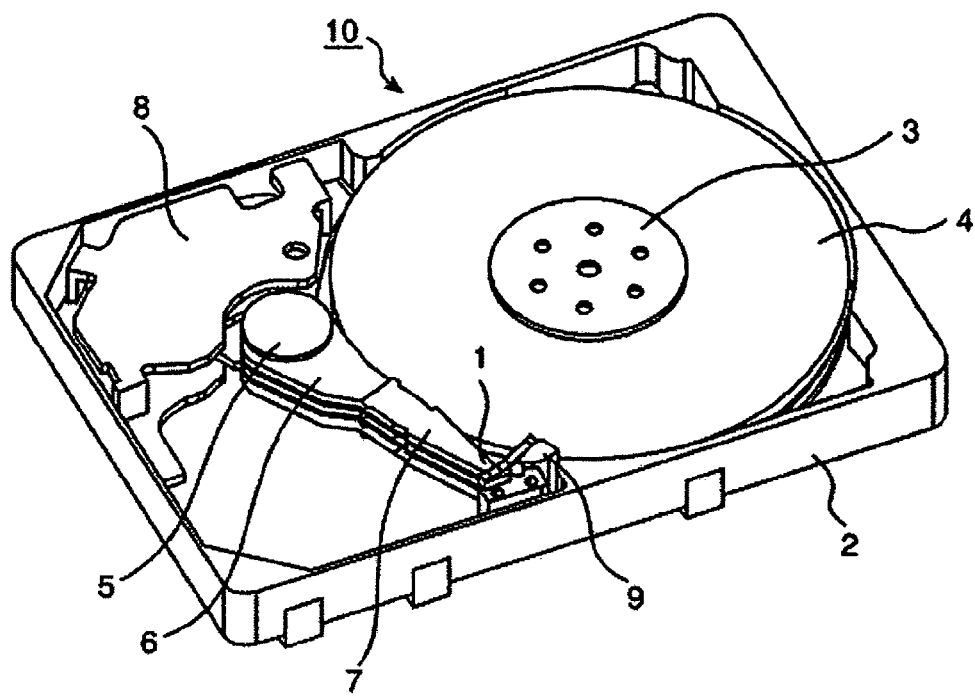
FIG. 4 is a schematic configuration diagram of a magnetic disk drive on which the read/write separation-type magnetic head is mounted.

A configuration diagram showing a magnetic disk drive 10 which has a read/write separation-type magnetic head according to an embodiment of the present invention is shown in FIG. 4. A magnetic disk 4 is mounted for rotation on a rotating shaft 3 of a spindle motor fixed to a base 2. An actuator arm 6 is pivotally supported on a pivot 5, and the actuator arm 6 has a suspension 7 at one end, and coils (not shown) that constitute a voice coil motor (VCM) 8, at the other end. A read/write separation-type magnetic head 1 is installed at a front end of the suspension 7. The base 2 has a ramp mechanism 9 positioned facing an outer periphery of the magnetic disk 4. The ramp mechanism 9 is formed with a slope onto which a lift tab (not shown) slides when the read/write separation-type magnetic head 1 is unloaded.

Supplying electric power to the coils of the VCM 8 generates torque in the actuator arm 6, thus rotationally moving the suspension 7 at one end thereof in a radial direction of the magnetic disk 4. The rotational movement moves the read/write separation-type magnetic head 1 at the front end of the suspension 7 to any position in the radial direction of the magnetic disk 4. Thus, the magnetic head 1 reads/writes data. During the unloading of the read/write separation-type magnetic head 1, it moves so that the lift tab gets on the slope of the ramp mechanism 9. During loading, the magnetic head 1 is loaded from a standby state of the lift tab within the ramp mechanism 9 onto a recording surface of the magnetic disk 4.

A schematic configuration of a magnetoresistive head according to the above embodiment of the present invention, and a schematic configuration of the read/write separation-type magnetic head used therein are described below using FIG. 3. A magnetoresistive head 30 for reading is formed at the top of a substrate 20 which operates as a slider, and an inductive magnetic recording head 80 is formed at the top of the magnetoresistive head 30 via a separation film 70 of an insulator. The magnetoresistive head 30 includes: a lower magnetic shield film 31; a lower gap film (not shown) that is formed at the top of the lower magnetic shield film 31; a spin-valve sensor film 32 formed at the top of the lower gap film; magnetic domain control films 62 and 63 formed at the top of the lower gap film, at both ends of the spin-valve sensor film 32; electrode films 64 and 65 formed at the tops of the magnetic domain control films 62 and 63, respectively; and an upper magnetic shield film 33 formed at the top of each such electrode film via an upper gap film (not shown).

The inductive magnetic recording head 80 includes: a lower magnetic film 81; an upper magnetic pole piece 83 formed via a magnetic gap film 82 so as to face the lower magnetic film 81; an upper magnetic film 84 serving as a yoke of the upper magnetic pole piece 83 and connected to the lower magnetic film 81 at a back gap portion; and conductor coils 85 formed between the lower magnetic film 81 and the upper magnetic film 84. The top of the inductive magnetic recording head 80 is covered with a hard protective film (not shown).

Figure 3:
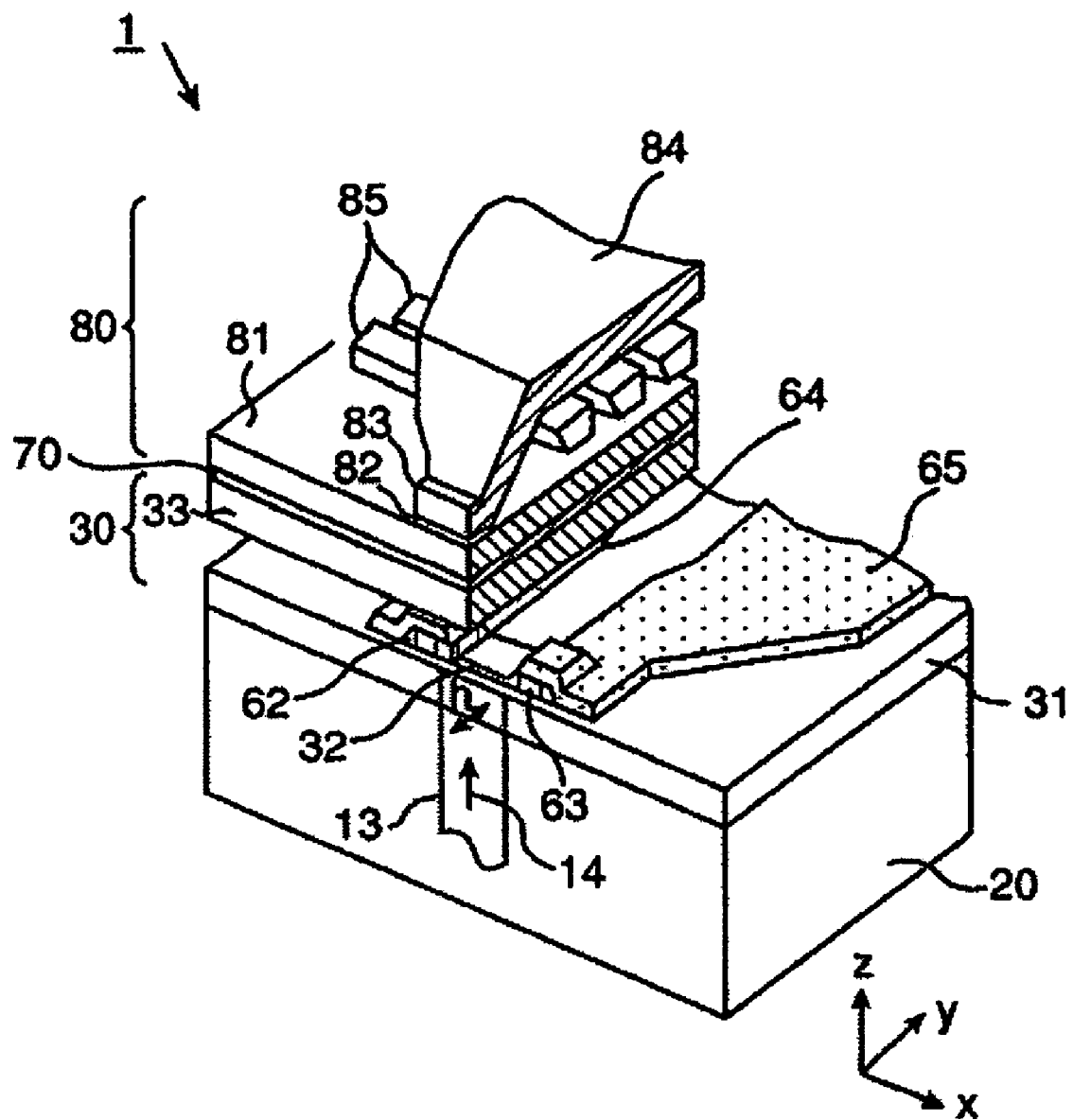
FIG. 3 is a perspective view of the air-bearing surface side of a read/write separation-type magnetic head having a magnetoresistive head and a magnetic recording head in combination in the above embodiment of the present invention.

FIG. 3 shows that a recording track 13, part of a magnetic disk 4, has relative movement directivity 14 with respect to the read/write separation-type magnetic head 1, along a Z-axis. The magnetic disk 4 that is a magnetic medium has multiple magnetic domains along the recording track 13 in the Z-axial direction, and a magnetic field "h" of each such magnetic domain changes along a Y-axis of the read/write separation-type magnetic head 1 as the VCM 8 moves the magnetic head 1 relatively along an X-axis. The change in the magnetic field is read out by the magnetoresistive head 30.

A ceramic substrate or a substrate with a dielectric film deposited on a ceramic material can be used as the substrate 20. Permalloy, Sendust, a Co-based amorphous material that exhibits soft magnetism, a microcrystalline ferromagnetic material that exhibits soft magnetism, or the like can be used for the lower magnetic shield film 31 and the upper magnetic shield film 33.

Figure 1:
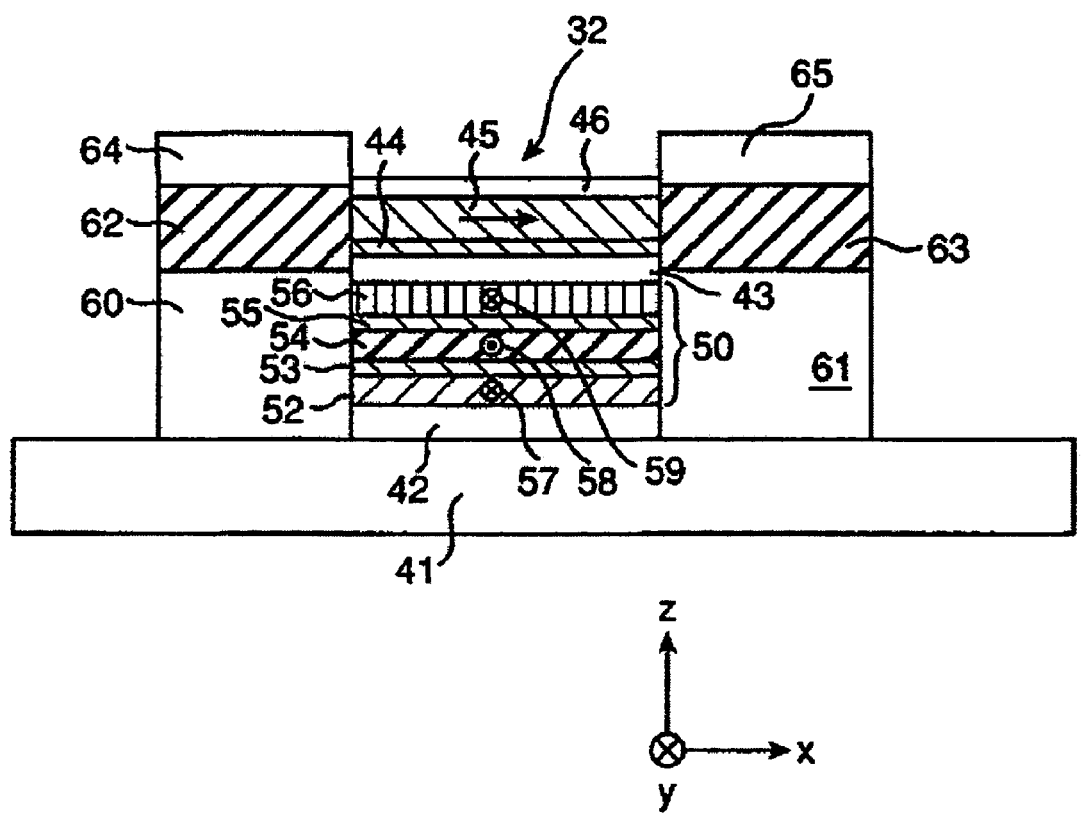
FIG. 1 is a view showing the configuration of the spin-valve sensor film in a magnetoresistive head according to an embodiment of the present invention, as viewed from the air-bearing surface side of the head.

A more specific configuration of the spin-valve sensor film 32 and the periphery thereof in the magnetoresistive head 30 is shown in FIG. 1. Referring to the configuration diagram of FIG. 1, the spin-valve sensor film 32 includes a first ferromagnetic layer relatively easy to respond to magnetic fields (hereinafter, this layer is called a free layer, which is equivalent to, for example, a Co film 44 and a Permalloy film 45), a second ferromagnetic layer relatively difficult to respond to magnetic fields (hereinafter, this layer is called the pinned layer, which is equivalent to a stacked-type pinned layer 50), and a nonmagnetic spacer layer (equivalent to, for example, a Cu film 43) that is formed between the above two layers. Under the stacked-type pinned layer 50, the spin-valve sensor film 32 also has an underlayer 42 that increases changes in resistance by adjusting a crystalline form. Additionally, the spin-valve sensor film 32 has a cap layer (equivalent to, for example, a Cu/Ta cap 46) on the free layer constituted by the ferromagnetic films 44 and 45. Magnetization directions of each ferromagnetic film in the stacked-type pinned layer 50 are denoted by numerals 57, 58, 59, in the figure. A magnetization direction of the foregoing free layer is, as indicated by an arrow, a direction orthogonal to the magnetization direction of the stacked-type pinned layer 50.

In the present embodiment, the stacked-type pinned layer 50 that uses three ferromagnetic films (equivalent to, for example, a ferromagnetic film AP0: 52, a ferromagnetic film AP1: 54, and a ferromagnetic film AP2: 56) and antiferromagnetic coupling films (equivalent to, for example, Ru films 53, 55) each formed between any two of the ferromagnetic films, is adopted as the pinned layer. This structure gives a configuration in which the head functions as a spin-valve-type reading head for use in a magnetic recording device. The pinned layer is constructed of the three ferromagnetic films because the pinned layer needs to be increased in yield strength. In this configuration, there is not an exchange-coupled layer adjacent to the pinned layer.

The spin-valve sensor film 32 is formed at the top of a lower gap film 41, and has: seed films 60, 61 formed at both ends; magnetic domain control films 62, 63 formed at the top of the seed films 60, 61, respectively, adjacently to free layers 44, 45, 46; and electrode films 64, 65 formed at the tops of the magnetic domain control films 62, 63, respectively.

Some of the advantages obtained when the pinned layer is constructed of three ferromagnetic films are described below by way of comparison with the case where the pinned layer is constructed of two ferromagnetic films. Two ferromagnetic films AP1 and AP2 that constitute a pinned layer in a spin-valve sensor film are shown in extracted form in FIG. 2A. This figure shows a side view of the structure of FIG. 1 so that magnetization directions of the ferromagnetic films can be identified. In this structure, in order to increase the pinned layer in terms of yield strength against to external magnetic fields, the films AP1 and AP2 are almost the same in magnetic moment, an antiferromagnetic coupling film such as an Ru film is interposed between the films AP1 and AP2, and the films AP1 and AP2 are strongly coupled to each other in antiparallel states. A magnetoresistive effect occurs according to the angle generated by magnetic moments of the free layer (Free) and of the film AP2, and in order to maximize the effect, a composition ratio of Fe in a Co—Fe alloy is set to range from 0 to 20%. Since a coercivity of the ferromagnetic film AP2 in this composition ratio range is not greater than 80 A/m (10 Oe), magnetization of a pinned layer which contains only the film AP2 is easily reversed by an external magnetic field and the pinned layer is not good enough in terms of yield strength against external magnetic fields or mechanical shocks. Accordingly, improving the yield strength against external magnetic fields and mechanical shocks by using the film AP1 with high coercivity has been considered. As described later herein, however, if a Co—Fe alloy is used, the coercivity of the film AP1 is 32 kA/m (400 Oe) at the greatest, which is not good enough to satisfy the above performance.

Figure 2:
FIGS. 2A and 2B are diagrams explaining the validity of using three ferromagnetic films to form the stacked-type pinned layer in the above embodiment of the present invention, by way of comparison with the case where the pinned layer is constructed of two ferromagnetic films.
Figure 2:
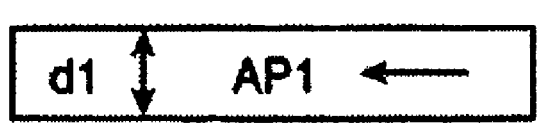
Figure 2:
Figure 2:
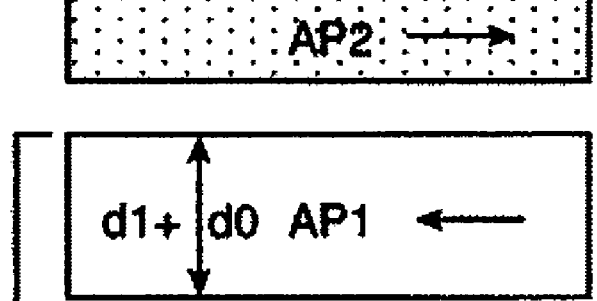
Figure 2:

In the present invention, therefore, a highly coercive film AP0 is added at the rear of the film AP1 to improve the yield strength of the pinned layer against external magnetic fields and mechanical shocks. An antiferromagnetic coupling film such as a Ru film is formed between the films AP0 and AP1, whereby the film AP0 and the film AP1 are strongly coupled to each other in antiparallel states. A structure only with those ferromagnetic films extracted is shown in FIG. 2B. In this structure, the films AP0 and AP1 are highly coercive films, which function as a layer to give internal energy for fixing the pinned layer formed up of the films AP0, AP1 and AP2. The film AP2 acts to increase the magnetoresistive effect. For increased magnetoresistance, the film AP2 is a Co—Fe alloy layer that contains 0-20 at % Fe, and consequently, the film AP2 is reduced in coercivity, thus not contributing to giving internal energy for fixing the pinned layer. In addition, the films AP0 and AP1 are coupled in antiparallel states, and the film AP1 and the film AP2 are also antiparallel-coupled, and film thicknesses are selected so that the total magnetic moment of the films AP0 and AP1 and the ferromagnetic film AP2 will be offset to become almost zero.

The pinned layer made up of the three ferromagnetic films, therefore, has a structure not easily permitting magnetic reversal against external magnetic fields, since the magnetic torques generated by external magnetic fields will offset one another. Yield strength against magnetic reversal due to mechanical shocks is determined by the coercive energy of each of the three ferromagnetic films. Since, as mentioned above, the film AP2 is small in coercive energy and provides almost no contributions, the two layers of great coercivity, i.e., the films AP0 and AP1, determine the yield strength against magnetic reversal due to mechanical shocks. Therefore, the yield strength improves as the films AP0 and AP2 increase in volume (film thickness).

As with that of FIG. 2A, the total magnetic moment of the films AP1 and AP0 is set to a value almost equal to a magnetic moment of the film AP2. In comparison between the two-layer structure of FIG. 2A showing the pinned layer including only the film AP1, and the two-layer structure with the films AP0 and AP1 in the present invention, the two-layer structure with the films AP0 and AP1 in the present invention (three-layer structure of the pinned layer) is the same as the film AP1 of the two-layer pinned layer structure in terms of total magnetic moment, and has a film thickness greater by 2d0. The coercive energy stored, therefore, will correspondingly increase, which means that the pinned layer can be increased in yield strength against external magnetic fields and mechanical shocks. This is further detailed below.

First, the film AP1 was enhanced in coercivity in order to maximize the yield strength of the pinned layer against external magnetic fields and mechanical shocks in the two-layer pinned layer structure of FIG. 2A.

(1) Films of the following configuration were produced on a substrate in order to examine the coercivity of the film AP1:

Seed film: Ni-12 at % Fe-40 at % Cr: X nm (film thickness)/ Ni-12 at % Fe: 0.6 nm AP1: Co—Y at % Fe: 2 nm Cap layer: Ru: 80 nm/Ta: 2 nm.

Figure 5:
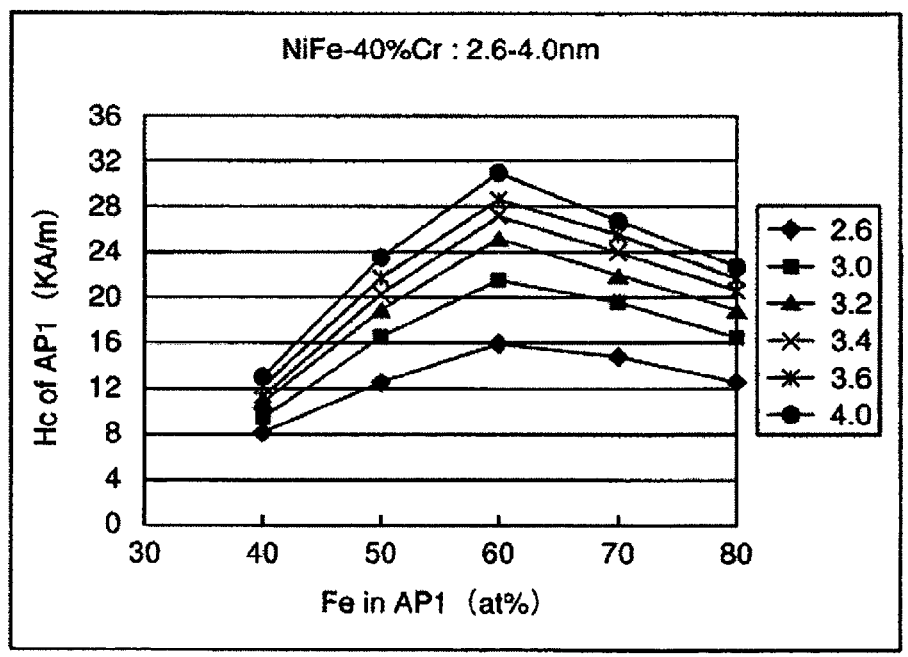
FIG. 5 is a graph showing the results of studying the dependence of coercivity of the ferromagnetic film AP1 in a two-layer pinned layer on the Fe composition by varying the film thickness of the NiFeCr seed film.

Study results on dependence of the film AP1 on the Fe composition observed when film thickness X of NiFeCr was changed to various values are shown in FIG. 5. As the Fe composition increases, the coercivity of the film AP1 increases and takes a maximum value at 60 at %. Also, as the film thickness of NiFeCr increases, the coercivity increases and takes a maximum value of 32 kA/m (400 Oe) at 4 nm. A giant magnetoresistive film (GMR film) was produced using 60 at % as the composition ratio of Fe in the film AP1 of the maximum coercivity, and 4 nm as the NiFeCr film thickness.

(2) A GMR film of the following configuration was produced on the substrate:

Seed film: NiFeCr: 4 nm/NiFe: 0.6 nm

Pinned layer: Co-60 at % Fe: X nm/Ru: 0.35 nm/Co-10 at % Fe: 2 nm (X: 1.5 to 1.8)

Spacer layer: Cu: 1.75 nm

Free layer: CoFe: 1 nm/NiFe: 1.5 nm

Cap layer: Cu: 0.6 nm/Ta: 2 nm.

Figure 6:
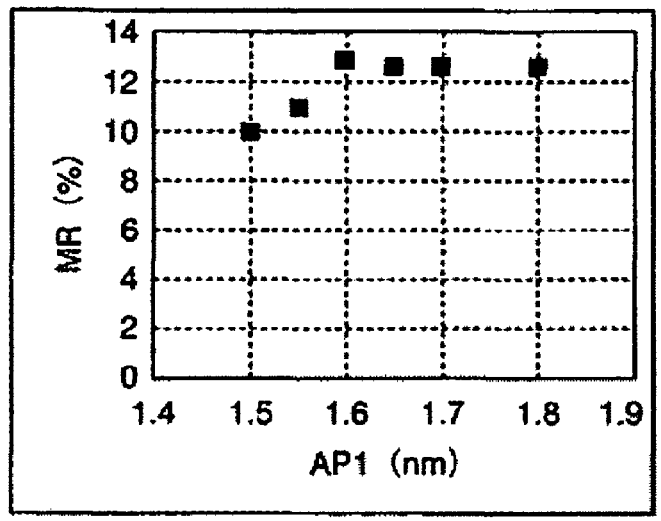
FIG. 6 shows a graph of the dependence of magnetoresistance changes, on the film thickness, observed when a film of a great coercivity was used as the ferromagnetic film AP1 in a two-layer pinned layer, and graphs of typical transfer curves.
Figure 6:
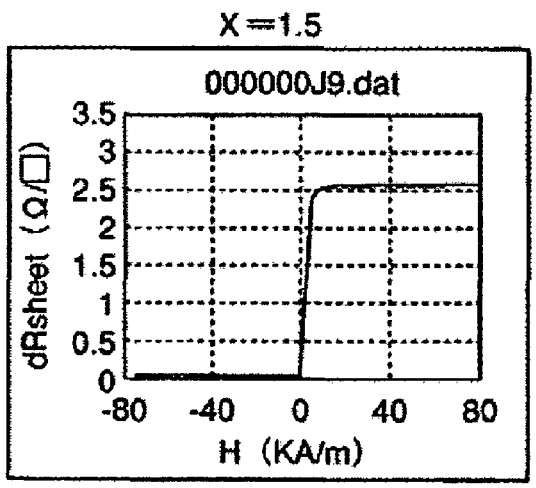
Figure 6:
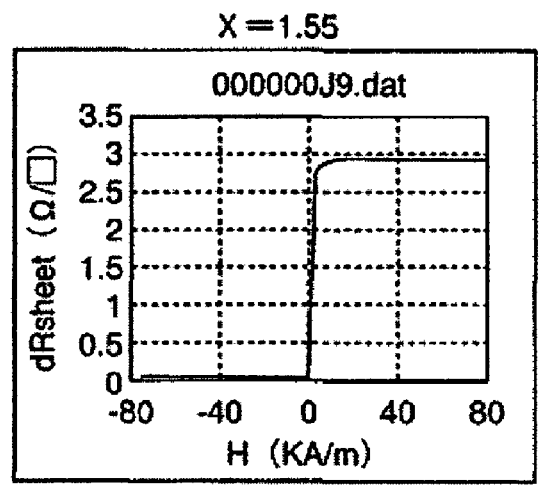
Figure 6:
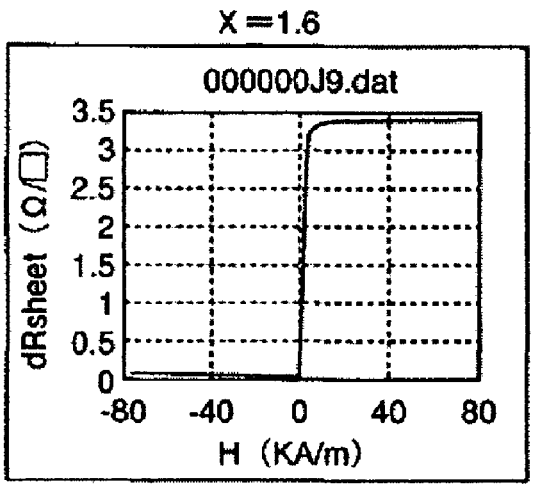
Figure 6:
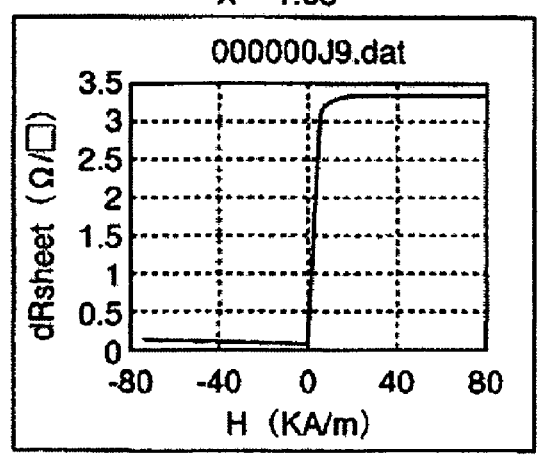

The MR curve, and the dependence of MR % on the film thickness of the film AP1, that were obtained are shown in FIG. 6. Favorable characteristics of 12%-13% in MR ratio for film thicknesses of 1.6 nm or more of the film AP1 are obtained.

(3) Next, a three-layer pinned layer with the film AP0 disposed at the rear of the film AP1 was studied. Co-60 at % Fe was used for both the films AP0 and AP1, and Co-10 at % Fe was used for the film AP2. More specifically, the film configuration below was adopted and the films AP0 and AP1 were both changed in film thickness:

Seed film: NiFeCr: 4 nm/NiFe: 0.6 nm

Pinned layer: Co-60 at % Fe: X nm/Ru: 0.35 nm/Co-60 at % Fe: 1.6+X nm/Ru: 0.35 nm/Co-10 at % Fe: 2 nm Spacer layer: Cu: 1.75 nm Free layer: CoFe: 1 nm/NiFe: 1.5 nm Cap layer: Cu: 0.6 nm/Ta: 2 nm.

As a result, increasing the film thicknesses of the films AP0 and AP1 under the above relationship caused abrupt changes in resistance and decreases in the MR ratio, and at X=2 nm, the MR ratio decreased to half. There occurred the adverse effects of the MR ratio decreasing significantly and thus of the sensor decreasing significantly in sensitivity. The abrupt decreases in the MR ratio are caused by the fact that a current flowing through the films AP0 and AP1 does not contribute to changing the magnetoresistance of the GMR sensor film.

Improving both the films AP0 and AP1 in resistivity to prevent such decreases in the MR ratio of the three-layer pinned layer was studied.

(4) Vanadium (V) based on a Co—Fe60 at % Fe alloy was added to form the films AP0 and AP1. The following GMR film configuration was adopted:

Seed film: NiFeCr: 4 nm/NiFe: 0.6 nm

Pinned layer: $(Co_{0.4}Fe_{0.6})_{100-X}V_X$: Y nm/Ru: 0.35 nm/$(Co_{0.4}Fe_{0.6})_{100-X}V_X$: Z nm/Ru: 0.35 nm/Co-10 at % Fe: 2 nm Spacer layer: Cu: 1.75 nm Free layer: CoFe: 1 nm/NiFe: 1.5 nm Gap layer: Cu: 0.6 nm/Ta: 2 nm.

Figure 7:
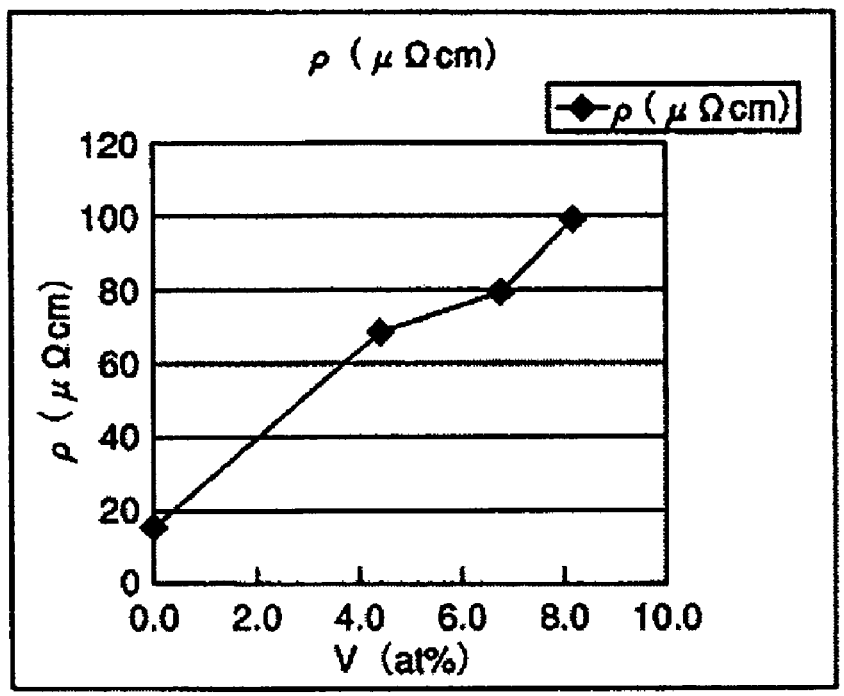
FIG. 7 shows graphs of the dependence, on the vanadium, of relative changes in the resistivities and magnetization characteristics of the films AP0 and AP1 in an example of the stacked-type pinned layer according to the above embodiment of the present invention.
Figure 7:
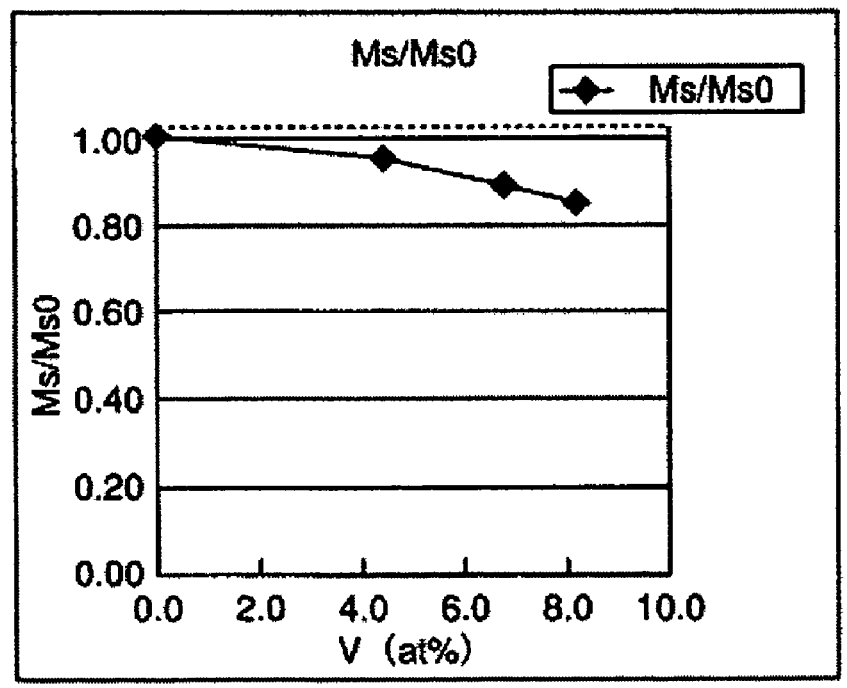

Values of Y and Z were varied with four vanadium composition ratios of 0 at %, 4.4 at %, 6.7 at %. and 8.2 at % to examine sheet resistance of the film. The relationship in relative change between the composition of vanadium, resistivities of the films AP0 and AP1, and magnetization is shown in FIG. 7. At the V (vanadium) composition ratio of 6.7 at %, a resistivity of 80 μΩcm is observed and 88% of the magnetization at 0 at % is obtained. At the V composition ratio of 8.2 at %, a resistivity of 100 μΩcm is observed and 84% of the magnetization at 0 at % is obtained. Since the increases in resistivity were abrupt in comparison with the small decreases in magnetization, it was found that adding vanadium is valid for suppressing a diversion loss of current.

(5) Changes in the coercivity of a Co—Fe film which contains vanadium (V) were examined. The film of the following configuration was created and changes in the coercivity of the film according to the amount of V added were examined:

Seed film: NiFeCr: 4 nm/NiFe: 0.60 nm

Ferromagnetic film: $(Co_{1-Y}Fe_Y)_{100-X}V_X$: 2 nm

Cap layer: Ru: 0.8 nm/Ta: 2 nm.

Figure 8:
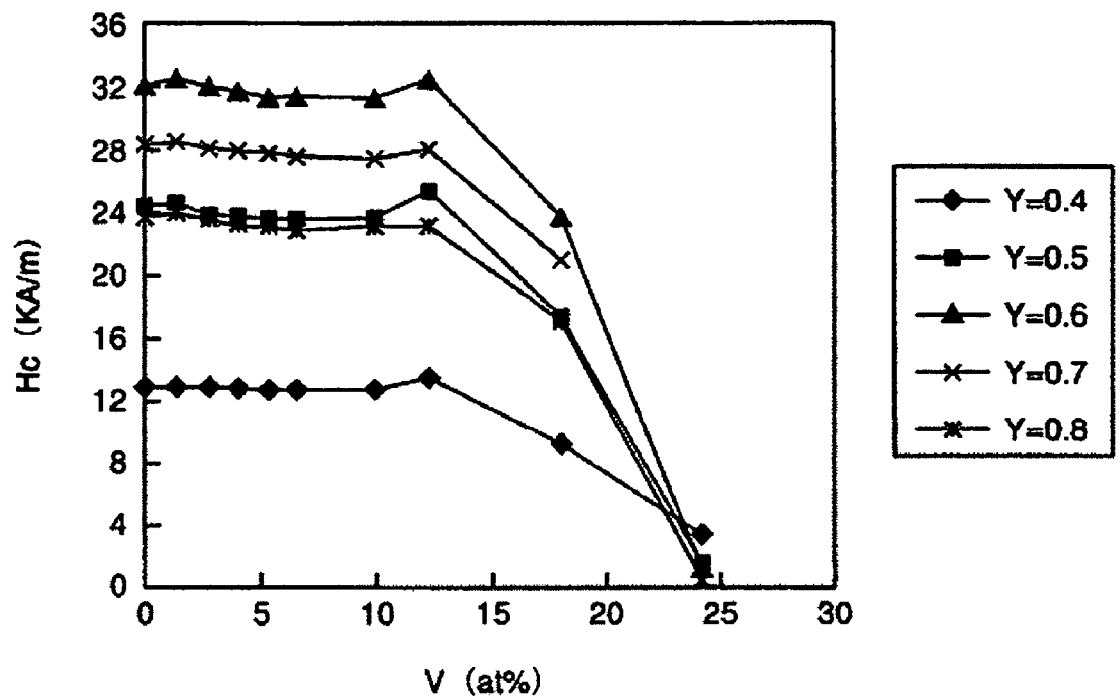
FIG. 8 shows graphs representing the dependences, on the Fe composition and vanadium, of coercivity in the films AP0 and AP1 used in another example of the stacked-type pinned layer according to the above embodiment of the present invention.

The dependence of coercivity on V (vanadium) composition is shown in FIG. 8. The same tendency is observed for all values of Y in Fe composition. Coercivity is kept almost constant for up to a V (vanadium) addition rate of 12 at %, and once 12 at % has been exceeded, the coercivity begins to decrease. It is therefore appropriate to control the addition rate of vanadium below 12 at %. In addition, the following expression needs to be satisfied to ensure a coercivity of about 16 kA/m (200 Oe) or more:

$(Co_{1-Y}Fe_Y)_{100-X}V_X$ where 0.4<Y<0.8 and 0<X<12.0.

Similar (or the same) effects can also be obtained by using an element such as Cr, Ti, Mo, Nb, Zr, or Ta, instead of vanadium.

Figure 9:
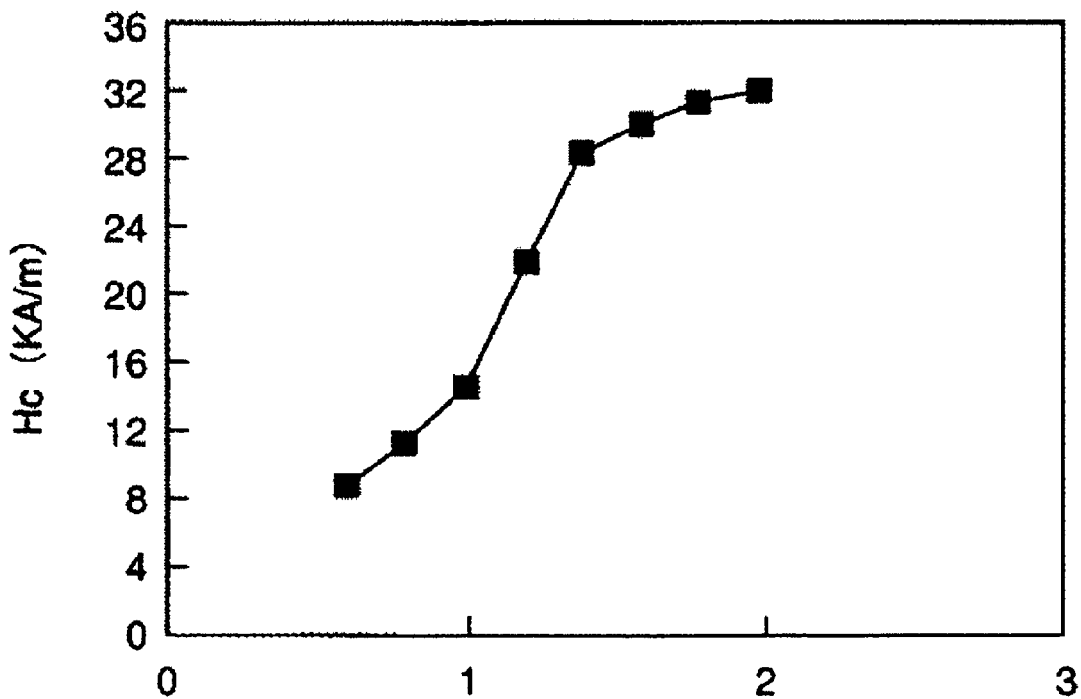
FIG. 9 is a graph showing the relationship between the film thicknesses and coercivities of the films AP0 and AP1 used in yet another example of the stacked-type pinned layer according to the above embodiment of the present invention.

Examination results on the relationship between the film thickness of the pinned layer in the following film configuration, and coercivity, are shown in FIG. 9:

Seed film: NiFeCr: 4 nm/NiFe: 0.6 nm

Ferromagnetic film: $(Co_{0.4}Fe_{0.6})_{96}V_4$: X nm

Cap layer: Ru: 0.8 nm/Ta: 2 nm.

When film thickness "d (X)" decreases below 1.4 nm, coercivity abruptly diminishes, and at 1 nm or less, the coercivity decreases below 16 kA/m (200 Oe). It is desirable, therefore, that the ferromagnetic film should have a thickness of 1.2 nm or more. Additionally, since X increases above 1.2 nm in the above typical configuration example (3) of a GMR film, the sum of AP0 and AP1 film thicknesses becomes 4 nm. This film thickness is 2.5 times as great as the film thickness of 1.6 nm obtained when AP0 is not added and only AP1 is added. It is expected from these facts that if resistivity is set to 2.5 times that obtained without V, since resistance values of the films AP0 and AP1 become almost equal to the resistance value of the film AP1 obtained in the above example (2) of configuration without the film AP0, a magnetoresistance change rate equivalent to that which was obtained in example (2) will be given. It is desirable, therefore, that the ferromagnetic film that constitutes the films AP0 and AP1 should have a resistivity of at least about 16×2.5=40 μΩcm. It is also desirable from the data of FIG. 7 that V should have a composition ratio of at least 2.0 at %.

As earlier mentioned, the yield strength of the pinned layer formed up of three ferromagnetic films in the present invention is determined primarily by highly coercive layers AP0 and AP1. How the coercive energy of the two highly coercive, ferromagnetic films is stored is described below.

(6) The configuration mainly with the films AP0 and AP1 was created and coercivity measured to evaluate the coercive energy stored into the films AP0 and AP1. The created film configuration is shown below.

Seed film: NiFeCr: 4 nm/NiFe: 0.6 nm

AP0 & AP1: $(Co_{0.5}Fe_{0.5})_{93.3}V_{6.7}$: X nm/Ru: 0.35 nm/ $(Co_{0.5}Fe_{0.5})_{93.3}V_{6.7}$: 2.25+X nm

Cap layer: Ru: 0.8 nm Å/Cu: 0.6 nm/Ta: 2 mm.

Five types of films with X values of 0 nm, 1.15 nm, 1.44 nm, 1.72 nm, and 2.30 nm were created. The film with the X value of 0 mm is the same as in the above configuration without the film AP0.

Figure 10:
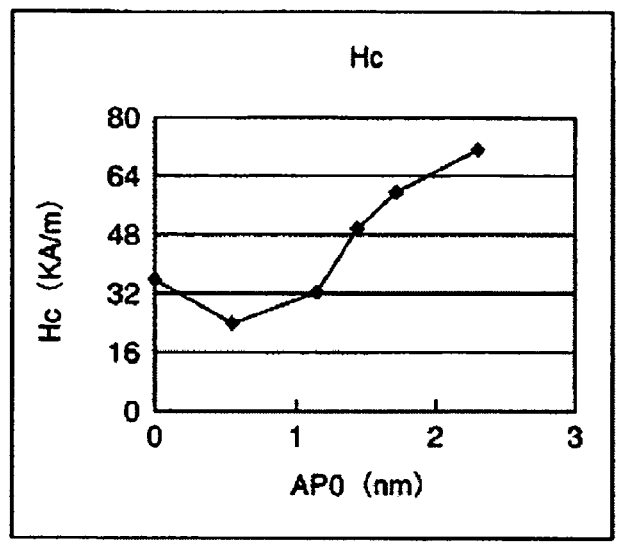
FIG. 10 shows graphs representing the dependence, on the AP0 film thickness, of coercivity in the films AP0 and AP1 used in a further example of the stacked-type pinned layer according to the above embodiment of the present invention.
Figure 10:
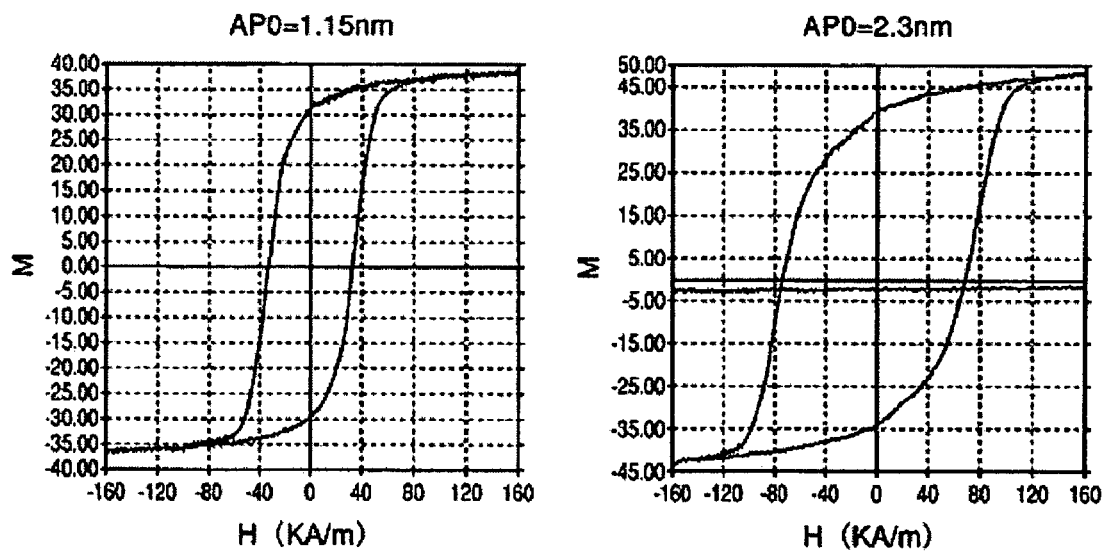

In this example, the difference in film thickness between the films AP0 and AP1 is kept to a constant value of 2.25 nm. An example of plotting the coercive force of each of the above films with respect to the film thickness of the film AP0, and examples of M-H curves are shown in FIG. 10. The coercivity of 32 kA/m (400 Oe) obtained at a zero film thickness of the film AP0 temporarily decreases at its film thickness of 0.5 nm. This is, as mentioned earlier, due to the fact that since 0.5 nm is smaller than a critical AP0 film thickness of 1.2 nm, the film AP0 decreases in coercivity. When the film thickness of the film AP0 is increased to 1.15 nm, the coercivity recovers to 32 kA/m (400 Oe) once again. Also, when the film thickness is further increased, the coercivity increases, and when the film thickness is increased to 2.30 nm, the coercivity reaches 72 kA/m (900 Oe). This value is twice or more of the value obtained without the value AP0, and indicates that the coercive energy is increased by providing the AP0 layer. These results also indicate that the film thickness of the film AP0 needs to be at least about 1.2 nm.

Based on these results, a spin-valve sensor film was produced. The film was configured as below and the film thickness of the film AP0 was changed:

Seed film: NiFeCr: 4 nm/NiFe: 0.6 mm

Pinned layer: $(Co_{0.5}Fe_{0.5})_{93.3}V_{6.7}$: X nm/Ru: 0.35 nm/ $(Co_{0.5}Fe_{0.5})_{93.3}V_{6.7}$: 2.25+X nm/Ru: 0.35 nm/$Co_{0.9}Fe_{0.1}$: 2 nm Spacer layer: Cu: 1.8 nm Free layer: Co—Fe: 1 mm/Ni—Fe: 1.5 nm Cap layer: Cu: 0.6 nm/Ta: 2 nm.

Figure 11:
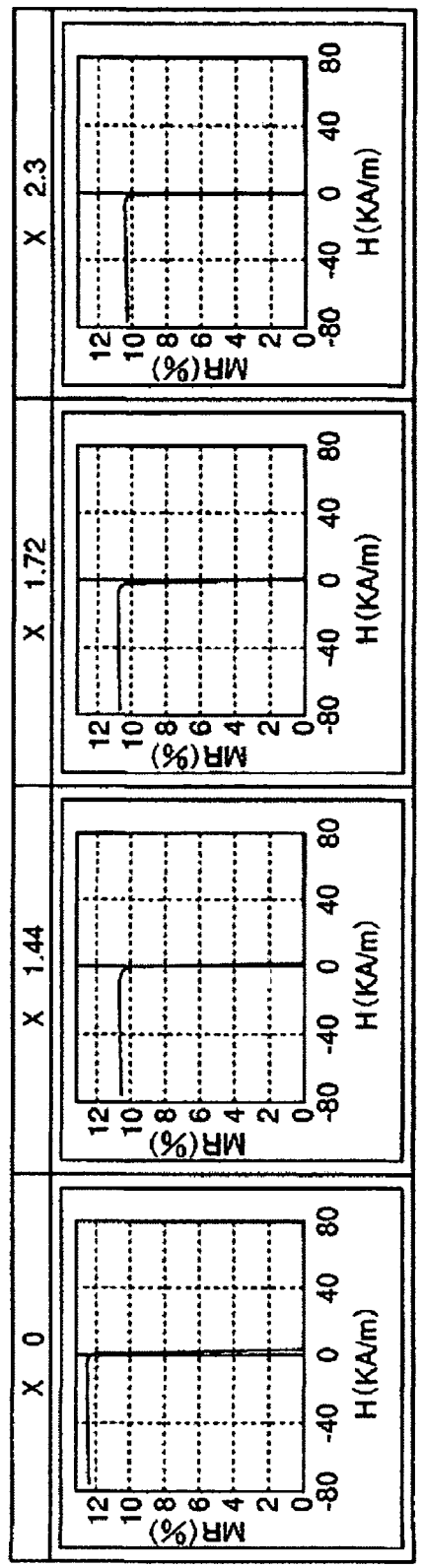
FIG. 11 is a list of graphs showing transfer curves with film thickness X of the film AP0 changed in a further example of the stacked-type pinned layer according to the above embodiment of the present invention.

Transfer curves with the film thickness X of the film AP0 that was changed to 0 nm, 1.44 nm, 1.72 nm, and 2.30 nm are shown in FIG. 11. As X is increased, a change rate of resistance gradually decreases. However, for the X value of 2.30 nm, i.e., even when the film thicknesses of the films AP0 and AP1 are as great as 4.75 nm, the change rate of resistance exceeds 10% and a rate of decrease in MR ratio is controlled to 15% or below. It was verified, therefore, that improving the films AP0 and AP1 in resistivity by adding vanadium is effective.

Next, a spin-valve film of the configuration described below was created for optimizing the composition of the film AP2 which comes into direct contact with a nonmagnetic spacer layer, and the relationship between an Fe composition of the film AP2 in a C—Fe alloy and a magnetoresistance change ratio was examined.

Figure 12:
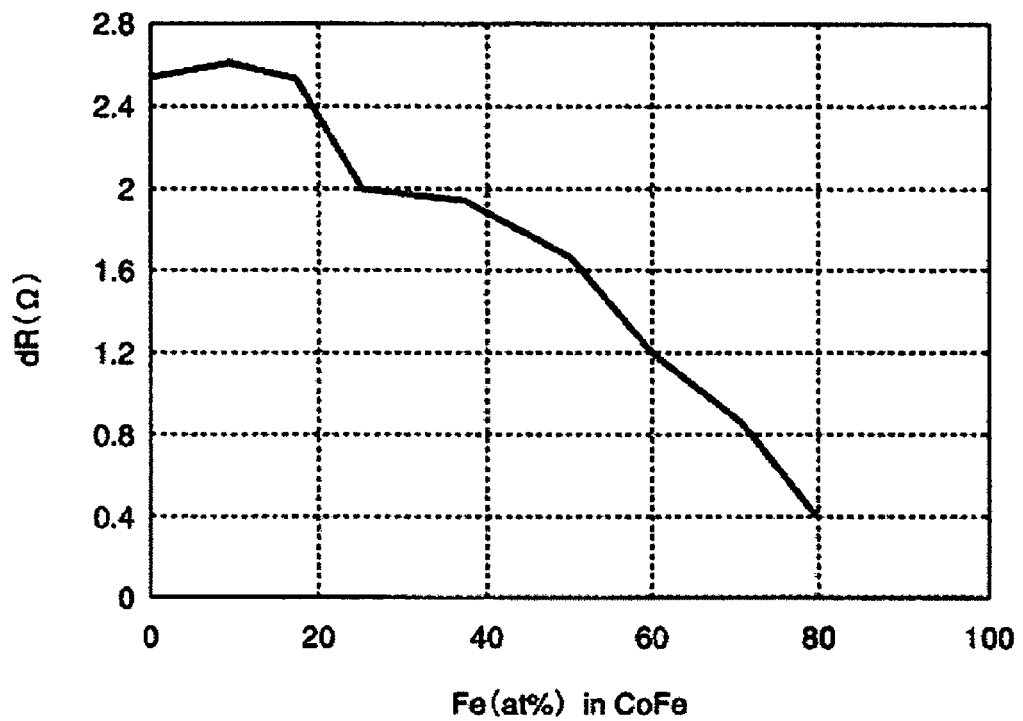
FIG. 12 is a graph representing the relationship between the Fe composition and magnetoresistance changes of the film AP2 in a further example of the stacked-type pinned layer according to the above embodiment of the present invention.

The relationship between the Fe composition of the film AP2 and the resistance change ratio is shown in FIG. 12. When the Fe composition exceeds 20%, the resistance change ratio suddenly decreases. This is due to the following. That is, although the film AP2 originally has a face-centered cubic crystal structure when the Fe composition is 20% or less, when 20% is exceeded, components of a body-centered cubic structure come into existence. This, in turn, creates components different from a body-centered cubic structure of Cu in the nonmagnetic spacer layer in terms of the periodicity of lattices, thus increasing electron scattering. It is therefore desirable that the Fe composition of the film AP2 which comes into direct contact with the nonmagnetic spacer layer should be about 20 at % or less.

Figure 13:
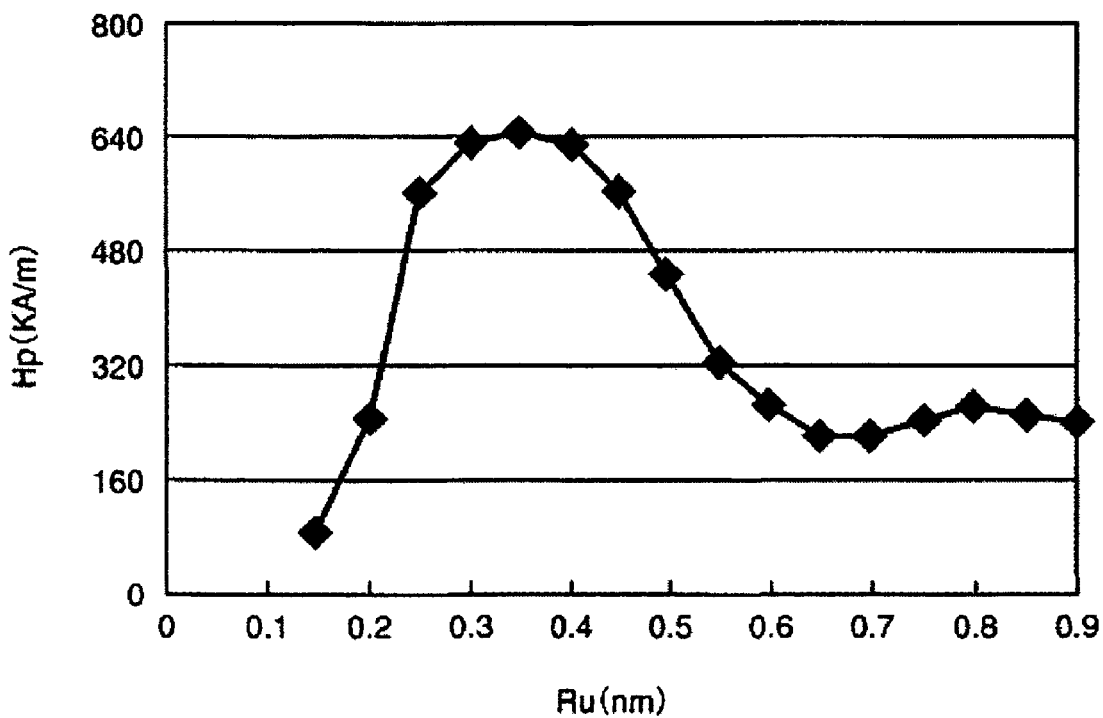
FIG. 13 is a graph representing the relationship between the film thickness of a Ru antiferromagnetic coupling film and the strength of an exchange-coupling magnetic field, in a further example of the stacked-type pinned layer according to the above embodiment of the present invention.

Next, a film thickness of a Ru antiferromagnetic film by which the ferromagnetic films forming a stacked-type pinned layer are to be coupled to each other in antiparallel states is described below. The stacked-type pinned layer shown below was created and the film thickness of the Ru film was changed to examine an exchange-coupling magnetic field. The results are shown in FIG. 13. In this case, the stacked-type pinned layer was formed into a two-layer structure to examine the exchange-coupling magnetic field via the Ru film:

Seed film: NiFeCr: 4 mm/NiFe: 0.6 nm

Pinned layer: $(Co_{0.5}Fe_{0.5})_{93.3}V_{6.7}$: 1.72 nm/Ru: 0.35 nm/ $(Co_{0.5}Fe_{0.5})_{93.3}V_{6.7}$: 1.72 nm Spacer layer: Cu: 1.75 nm Free layer: CoFe: 1 nm/NiFe: 1.5 nm Cap layer: Cu: 0.6 nm/Ta: 2 nm.

As can be seen from the figure, the exchange-coupling magnetic field becomes a maximum when the film thickness of the Ru film ranges from 0.3 to 0.4 mm. Strength of the exchange-coupling magnetic field denotes that of the pinned layer against the external magnetic field holding the antiparallel structure of the pinned layer, and it is desirable that the strength be greater. Accordingly, it is desirable that an Ru film thickness from about 0.3 to 0.4 nm should be used.

In the above embodiment, the stacked-type pinned layer has a structure in which it is disposed on the substrate side and a nonmagnetic spacer layer and free layers are arranged at the top of the stacked-type pinned layer. The present invention is not limited to this structure, and the same effects as, or effects similar to, those of the above embodiment can also be obtained in a structure having free layers arranged on the substrate side and a nonmagnetic spacer layer and a stacked-type pinned layer at the top of the free layers.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetoresistive head comprising:
    a substrate;
    a lower magnetic shield film and an upper magnetic shield film, both disposed at the top of said substrate;
    a stacked-type pinned layer and free layers, each disposed between said lower magnetic shield film and said upper magnetic shield film;
    a nonmagnetic spacer layer disposed between said stacked-type pinned layer and said free layers;
    magnetic domain control films disposed at both ends of each of said free layers; and
    electrode films each arranged at the top of each of said magnetic domain control films;
    wherein:
    said stacked-type pinned layer includes only three ferromagnetic films, and antiferromagnetic coupling films each disposed between any two of said ferromagnetic films; and of said ferromagnetic films, one ferromagnetic film adjacent to said nonmagnetic spacer layer has highly magnetoresistive characteristics with a Fe composition of 20 at % or less, and both of the other ferromagnetic films each have a coercivity and a resistivity higher than a coercivity and a resistivity of said highly magnetoresistive ferromagnetic film;

wherein said stacked-type pinned layer does not have an adjacent exchange-coupling layer.

2. The magnetoresistive head according to claim 1, wherein magnetization directions of said ferromagnetic films constituting said stacked-type pinned layer are antiparallel to one another.

3. The magnetoresistive head according to claim 1, wherein a sum of the magnetic moments generated by said stacked-type pinned layer is substantially zero.

4. The magnetoresistive head according to claim 1, wherein coercivities of said other ferromagnetic films are at least 16 kA/m and resistivities thereof are at least 40 μΩcm.

5. The magnetoresistive head according to claim 1, wherein said stacked-type pinned layer is disposed adjacently to said substrate, and said free layers are arranged at positions more distant from said substrate than a position of stacked-type pinned layer.

6. A magnetoresistive head comprising:

a substrate;

a lower magnetic shield film and an upper magnetic shield film, both disposed at the top of said substrate;

a stacked-type pinned layer and free layers, all disposed between said lower magnetic shield film and said upper magnetic shield film;

a nonmagnetic spacer layer disposed between said stacked-type pinned layer and said free layers;

magnetic domain control films disposed at both ends of each of said free layers; and electrode films arranged each at the top of each of said magnetic domain control films;

wherein:

said stacked-type pinned layer has only three ferromagnetic films, and antiferromagnetic coupling films each disposed between any two of said ferromagnetic films; and of said ferromagnetic films, one ferromagnetic film adjacent to said nonmagnetic spacer layer has a composition rate satisfying Co100-ZFez, 20≧Z(at %)≧0, and both of the other ferromagnetic films, except the ferromagnetic film adjacent to said nonmagnetic spacer layer, each have a composition rate satisfying (Co1-YFeY)100-XMX, 0.8≧Y(at %)≧0.4, 12≧X(at %)≧2 where M is an element selected from the group consisting of V, Cr, Ti, Mo, Nb, Zr, and Ta;

wherein said stacked-type pinned layer does not have an adjacent exchange-coupling layer.

7. The magnetoresistive head according to claim 6, wherein, except for said ferromagnetic film adjacent to said nonmagnetic spacer layer, film thicknesses of the other of said ferromagnetic films forming said stacked-type pinned layer are each at least about 1.2 nm.

8. The magnetoresistive head according to claim 6, wherein said antiferromagnetic coupling films are Ru films, film thicknesses of which range from about 0.3 to 0.4 nm.

9. The magnetoresistive head according to claim 6, wherein said stacked-type pinned layer is disposed on an underlayer.

10. A read/write separation-type magnetic head, comprising:

a magnetoresistive head including:

a substrate;

a lower magnetic shield film and an upper magnetic shield film, both of said films being disposed at the top of said substrate;

a stacked-type pinned layer and free layers, each of said layers being disposed between said lower magnetic shield film and said upper magnetic shield film;

a nonmagnetic spacer layer disposed between said stacked-type pinned layer and said free layers;

magnetic domain control films disposed at both ends of each of said free layers; and electrode films each arranged at the top of each of said magnetic domain control films;

wherein said stacked-type pinned layer has only three ferromagnetic films, and antiferromagnetic coupling films each disposed between any two of said ferromagnetic films; one of said ferromagnetic films that is adjacent to said nonmagnetic spacer layer has highly magnetoresistive characteristics with a Fe composition of 20 at % or less, and both of the other ferromagnetic films each have coercive and resistive characteristics superior to coercive and resistive characteristics of said highly magnetoresistive ferromagnetic film; and a magnetic recording head provided adjacently to said magnetoresistive head, said magnetic recording head including:

a lower magnetic film;

a magnetic gap film;

an upper magnetic film which is formed with a magnetic pole piece facing said lower magnetic film via said magnetic gap film; and conductor coils each disposed between said lower magnetic film and said upper magnetic film wherein said stacked-type pinned layer does not have an adjacent exchange-coupling layer.

11. The magnetoresistive head according to claim 10, wherein magnetization directions of said ferromagnetic films constituting said stacked-type pinned layer are antiparallel to one another.

12. The magnetoresistive head according to claim 10, wherein a sum of the magnetic moments generated by said stacked-type pinned layer is substantially zero.

13. The magnetoresistive head according to claim 10, wherein coercivities of said other ferromagnetic films are at least 16 kA/m and resistivities thereof are at least 40 μΩcm.

14. The magnetoresistive head according to claim 10, wherein said stacked-type pinned layer is disposed adjacently to said substrate, and said free layers are arranged at positions more distant from said substrate than a position of stacked-type pinned layer.

\* \* \* \* \*

UNITED STATES PATENT AND TRADEMARK OFFICE
CERTIFICATE OF CORRECTION

PATENT NO. : 7,623,323 B2  Page 1 of 1
APPLICATION NO. : 11/227677
DATED : November 24, 2009
INVENTOR(S) : Nishioka et al.

It is certified that error appears in the above-identified patent and that said Letters Patent is hereby corrected as shown below:

Column 8, line 57, please delete "Ni-12 at % Fe:0.6 nm"

and insert -- Ni-15 at % Fe:0.6 nm --

Signed and Sealed this

Second Day of February, 2010

David J. Kappos
*Director of the United States Patent and Trademark Office*